United States Patent
Terada et al.

(10) Patent No.: US 10,040,251 B2
(45) Date of Patent: Aug. 7, 2018

(54) LAYERED OBJECT, METHOD FOR MANUFACTURING LAYERED OBJECT, AND APPARATUS FOR MANUFACTURING LAYERED OBJECT

(71) Applicant: KABUSHIKI KAISHA TOSHIBA, Minato-ku (JP)

(72) Inventors: Takahiro Terada, Yokohama (JP); Hiroshi Ohno, Yokohama (JP); Aya Watase, Ota (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 0 days.

(21) Appl. No.: 15/023,887

(22) PCT Filed: Sep. 4, 2014

(86) PCT No.: PCT/JP2014/073341
§ 371 (c)(1),
(2) Date: Mar. 22, 2016

(87) PCT Pub. No.: WO2015/141027
PCT Pub. Date: Sep. 24, 2015

(65) Prior Publication Data
US 2016/0375637 A1    Dec. 29, 2016

(30) Foreign Application Priority Data
Mar. 18, 2014    (JP) .................. 2014-054420

(51) Int. Cl.
*B29C 67/00*    (2017.01)
*B33Y 10/00*    (2015.01)
(Continued)

(52) U.S. Cl.
CPC ........ *B29C 67/0077* (2013.01); *B22F 3/1055* (2013.01); *B22F 7/02* (2013.01);
(Continued)

(58) Field of Classification Search
None
See application file for complete search history.

(56) References Cited

U.S. PATENT DOCUMENTS

2002/0041818 A1    4/2002    Abe et al.
2006/0165546 A1    7/2006    Yamada et al.
(Continued)

FOREIGN PATENT DOCUMENTS

JP    2003-1714 A    1/2003
JP    2006-200030 A    8/2006
(Continued)

OTHER PUBLICATIONS

International Search Report dated Nov. 25, 2014 in PCT Application No. PCT/JP2014/073341, filed Sep. 4, 2014 (English Translation only).

(Continued)

*Primary Examiner* — Erma C Cameron
(74) *Attorney, Agent, or Firm* — Oblon, McClelland, Maier & Neustadt, L.L.P.

(57) ABSTRACT

A layered object including a plurality of layers, the layered object includes a first part, and a second part. The first part includes a first face having a shape of protrusions and depressions. The first part constitutes a part of the layers. The second part is in contact with the first face. The second part includes a second face that fits with the protrusions and depressions and includes a third face opposite the second face. The second part includes another part of the layers. The third face includes a portion that has a higher degree of flatness than a degree of flatness of the protrusions and depressions.

6 Claims, 10 Drawing Sheets

(51) Int. Cl.
*B22F 3/105* (2006.01)
*B22F 7/02* (2006.01)
*B33Y 30/00* (2015.01)
*B33Y 80/00* (2015.01)

(52) U.S. Cl.
CPC ....... *B33Y 10/00* (2014.12); *B22F 2003/1056* (2013.01); *B22F 2998/10* (2013.01); *B29C 67/0051* (2013.01); *B33Y 30/00* (2014.12); *B33Y 80/00* (2014.12); *Y02P 10/295* (2015.11)

(56) References Cited

U.S. PATENT DOCUMENTS

| | | | | |
|---|---|---|---|---|
| 2013/0052415 A1* | 2/2013 | Burns | ................ | B22F 3/22 428/141 |
| 2013/0052442 A1* | 2/2013 | Merrill | ................ | B22F 7/02 428/220 |

FOREIGN PATENT DOCUMENTS

| | | |
|---|---|---|
| JP | 2013-75392 A | 4/2013 |
| JP | 2013-143439 A | 7/2013 |

OTHER PUBLICATIONS

Japanese Office Action dated Mar. 15, 2016 in Japanese Application No. 2014-054420 (with English Translation).

* cited by examiner

LAYERED OBJECT, METHOD FOR MANUFACTURING LAYERED OBJECT, AND APPARATUS FOR MANUFACTURING LAYERED OBJECT

CROSS-REFERENCE TO RELATED APPLICATIONS

This application is national stage application of International Application No. PCT/JP2014/073341, filed Sep. 4, 2014, which designates the United States, incorporated herein by reference, and which is based upon and claims the benefit of priority from Japanese Patent Application No. 2014-054420, filed Mar. 18, 2014, the entire contents of each of which are incorporated herein by reference.

FIELD

Embodiments described herein relate generally to a layered object, a method for manufacturing the layered object, and an apparatus for manufacturing the layered object.

BACKGROUND

Methods are known by which objects having a desired shape can be made by, for example, heating material by a laser beam while the material is being fed, and fusing the material. It is desirable to increase rigidity of such objects.

DETAILED DESCRIPTION

According to an embodiment, in general, a layered object including a plurality of layers, the layered object comprises a first part and a second part. The first part includes a first face having a shape of protrusions and depressions. The first part constitutes a part of the layers. The second part is in contact with the first face. The second part includes a second face that fits with the protrusions and depressions and includes a third face opposite the second face. The second part includes another part of the layers. The third face includes a portion that has a higher degree of flatness than a degree of flatness of the protrusions and depressions.

The following describes embodiments of the present invention with reference to the accompanying drawings.

The drawings are conceptual and schematic drawings, and thus, for example, the relation between the thickness and the width of each part and dimensional ratios between parts are not necessarily identical to those of the actual ones. Same parts may be illustrated in different dimensions or ratios depending on the drawings.

In the present description and the drawings, same reference signs are given to the same elements that have already been explained with reference to a drawing mentioned before, and detailed explanations thereof are omitted as appropriate.

First Embodiment

Figure 1:
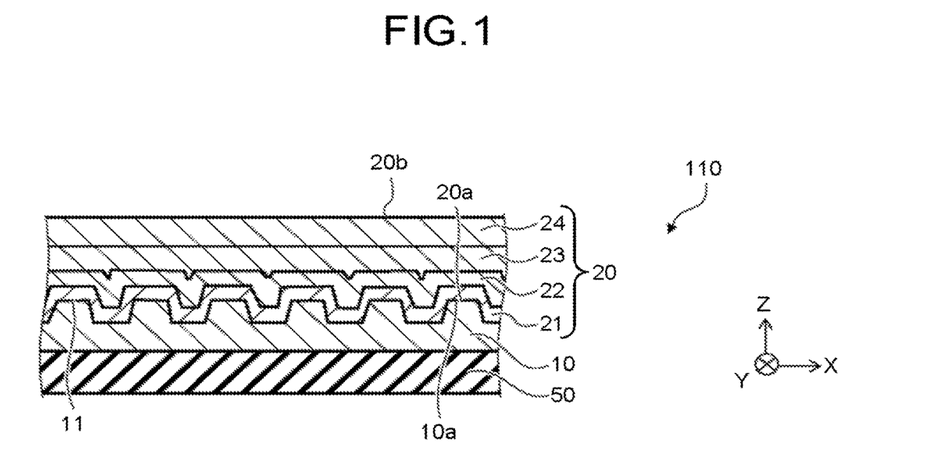
FIG. 1 is a schematic cross-sectional view illustrating an example of a layered object according to a first embodiment.

FIG. 1 is a schematic cross-sectional view illustrating an example of a layered object according to a first embodiment.

As illustrated in FIG. 1, this layered object 110 according to the first embodiment is formed of a plurality of layers. In this example, the layered object 110 includes a first part 10 (layer) and a second part 20. The first part 10 constitutes a part of the layers. The first part 10 is, for example, a layer. The second part 20 constitutes another part of the layers. The second part 20 includes, for example, a plurality of layers (such as layers 21 to 24). The number of layers included in the second part 20 may be any number.

Each layer included in the layered object 110 is formed such that, for example, material is heated and fused by energy rays (such as laser beams) while the material is being fed. The layered object 110 is formed by depositing a plurality of layers one by one. An example of the method for forming the layered object 110 will be described later.

A direction extending from the first part 10 to the second part 20 is defined as a Z-axis direction. A direction perpendicular to the Z-axis direction is defined as an X-axis direction. A direction perpendicular to the Z-axis direction and the X-axis direction is defined as a Y-axis direction.

Each layer of the layered object 110 extends in an X-Y plane. A plurality of layers are deposited in the Z-axis direction. The layered object 110 can be formed into a desired shape by changing the shape of each layer in the X-Y plane.

The first part 10 has a first face 10a. The first face 10a faces the second part 20. The first face 10a has protrusions and depressions 11.

The second part 20 is in contact with the first face 10a. The second part 20 has a second face 20a and a third face 20b. The second face 20a fits with the protrusions and depressions 11 on the first face 10a. The second face 20a conforms to the shape of the first face 10a. The third face 20b is at the opposite side of the second face 20a.

In this example, the layered object 110 is formed on a base 50. The base 50 may be removed after the layered object 110 is formed. At least a part of the base 50 may be included in the layered object 110. The base 50 may contain the same material as the layered object 110, or may contain a different material.

Figure 2:
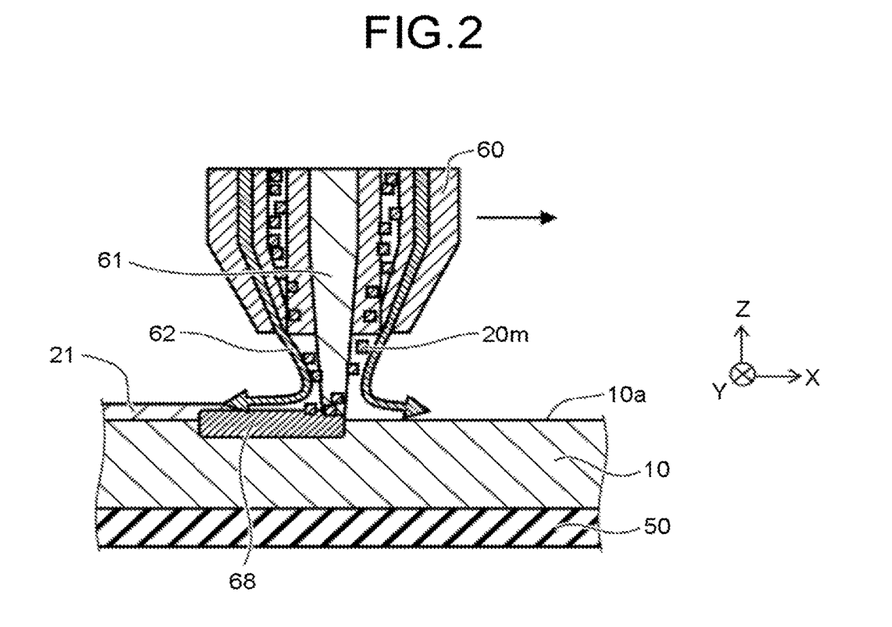
FIG. 2 is a schematic cross-sectional view illustrating an example of a method for manufacturing the layered object according to the first embodiment.

FIG. 2 is a schematic cross-sectional view illustrating an example of a method for manufacturing the layered object according to the first embodiment. As illustrated in FIG. 2, the first part 10 is provided on the base 50. In FIG. 2, the protrusions and depressions 11 on the first face 10a are omitted. Material 20m of the second part 20 is fed to the first face 10a. For example, metal particles or resin particles are used as the material 20m. The material 20m may be any material.

In this example, a head 60 is used. The material 20m is ejected from the head 60. To control the directions in which the material 20m goes, for example, shielding gas 62 flows out from the head 60. The head 60 also emits an energy ray 61 (for example, a laser beam).

From the head 60, the material 20m is fed to the first face 10a and the energy ray 61 is simultaneously emitted. The material 20m is then fused and bonded at selective locations. For example, a portion of the first part 10 irradiated with the energy ray 61 is partially heated, and a fusion area 68 is formed. The material 20m is fed to the fusion area 68, and fused and bonded. The material 20m may be irradiated with the energy ray 61 and fused before the material 20m is fed to the first part 10.

The positional relation between the head 60 and the base 50 changes in the X-Y plane. In other words, thermal energy is generated at different locations. At a location to which the material 20m is fed and the energy ray 61 is emitted, a part of the second part 20 (for example, a layer 21) is formed from the material 20m. This process is performed by changing locations in the X-Y plane. A layer (layer 21) extending in the X-Y plane is thus formed. This layer constitutes a part of the second part 20.

FIGS. 3A to 3E are schematic cross-sectional views sequentially illustrating an example of the processes of the method for manufacturing the layered object according to the first embodiment.

Figure 3A:
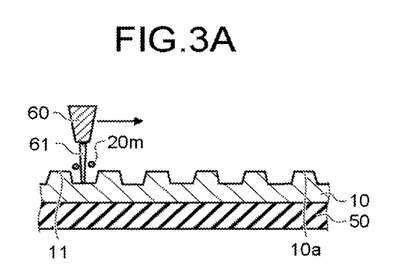
FIGS. 3A to 3E are schematic cross-sectional views sequentially illustrating an example of the processes of the method for manufacturing the layered object according to the first embodiment.

As illustrated in FIG. 3A, the first part 10 is formed. In this example, the first part 10 is formed on the flat base 50. For example, the head 60 emits the energy ray 61, while feeding the material 20m, to the base 50. In this process, a layer having a flat face is formed. The head 60 further emits the energy ray 61 to a selective location on the flat layer while feeding the material 20m. In this process, a protruding portion is formed on the selective location. The first part 10 is thus formed.

The head 60 further emits the energy ray 61 to the first face 10a of the first part 10 while feeding the material 20m. In other words, the first face 10a is heated.

Figure 3B:
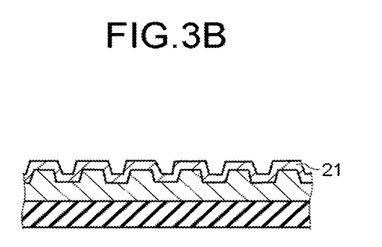

In this process, the layer 21 that constitutes a part of the second part 20 is formed from the material 20m as illustrated in FIG. 3B. The shape of the layer 21 relatively conforms to the protrusions and depressions 11 on the first face 10a. The material 20m is likely to be trapped in a depressed portion of the protrusions and depressions 11 on the first face 10a. The trapped material 20m is used for the formation of the layer 21 (a part of the second part 20), and thus utilization efficiency of the material 20m can be enhanced.

Figure 3C:
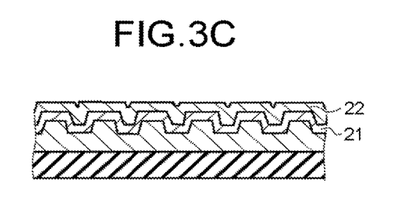

As illustrated in FIG. 3C, a layer 22 is formed on the layer 21 by feeding and heating the material 20m. For example, the material 20m is likely to be trapped in a depressed portion of the protrusions and depressions on the layer 21. Thus, the protrusions and depressions on the face of the layer 22 are likely to be flatter than those on the face of the layer 21. Furthermore, for example, the protrusions and depressions on the face of the layer 22 are likely to be flatter than those on the face of the layer 21 by the coverage of the layers 21 and 22.

Figure 3D:
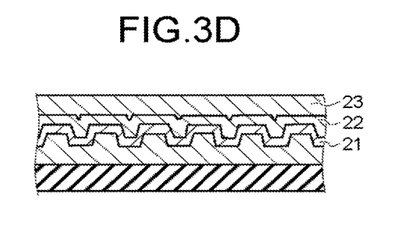

As illustrated in FIG. 3D, a layer 23 is formed on the layer 22 by feeding and heating the material 20m. The face of the layer 23 is flatter than that of the layer 22.

Figure 3E:
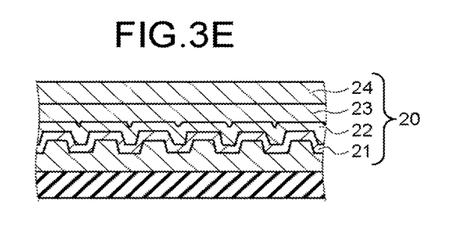

As illustrated in FIG. 3E, a layer 24 is formed on the layer 23 by feeding and heating the material 20m. The face of the layer 24 is flatter than that of the layer 23.

As described above, a plurality of layers are formed to obtain upper the layers flatter than the lower layers.

As described above, the second part 20 is formed by depositing a plurality of layers on the first part 10 that has the protrusions and depressions 11.

In the first embodiment, for example, the protrusions and depressions 11 are provided on the face (first face 10a) of the first part 10 in the formation of the layered object 110 having the flat third face 20b. The second part 20 is formed on the protrusions and depressions 11. This configuration, for example, increases the contact area between the first part 10 and the second part 20. When the second part 20 is formed on the flat first part 10, the first part 10 and the second part 20 may be separated at the boundary therebetween. To prevent this situation, the protrusions and depressions 11 are provided on the face of the first part 10 in the first embodiment. Thus, the contact area is increased, and such separation can be prevented. According to the first embodiment, a layered object having high rigidity can be obtained.

In the first embodiment, for example, at least a part of the second part 20 contains a material identical to a material of the first part 10. Specifically, a part including the second face 20a of the second part 20 contains a material identical to a material of a part including the first face 10a of the first part 10.

Providing the protrusions and depressions 11 on the first face 10a can enhance the utilization efficiency of the material 20m as described below.

Figure 4:
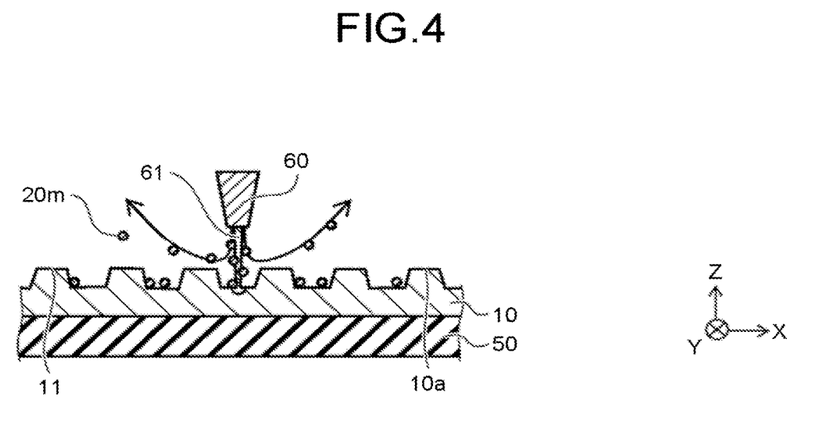
FIG. 4 is a schematic cross-sectional view illustrating an example of a process of manufacturing the layered object according to the first embodiment.

FIG. 4 is a schematic cross-sectional view illustrating an example of a process of manufacturing the layered object according to the first embodiment. The inventors conducted an analysis and have found out that, as illustrated in FIG. 4, the material 20m ejected from the head 60 goes in various directions in some cases when the material 20m is fed to the first part 10. In other words, the inventors have found out that the material 20m goes from the head 60 to the first part 10, and that a part of the material 20m spreads in horizontal directions (directions in the X-Y plane). For example, the material 20m ejected from the head 60 hits the first part 10 and is reflected on the first part 10. This also causes the material 20m to spread in various directions. Consequently, a part of the material 20m ejected from the head 60 remains as a part of the second part 20, but the rest of the material 20m is dispersed. In other words, the utilization efficiency of the material 20m is low.

In the first embodiment, the first face 10a of the first part 10 is provided with the protrusions and depressions 11. As a result, the material 20m ejected from the head 60 is likely to stay in the depressed portion of the protrusions and depressions 11. The material 20m is trapped in the depressed portion. This configuration can reduce the amount of the material 20m to be dispersed. Thus, the utilization efficiency of the material 20m can be enhanced.

Figure 5:
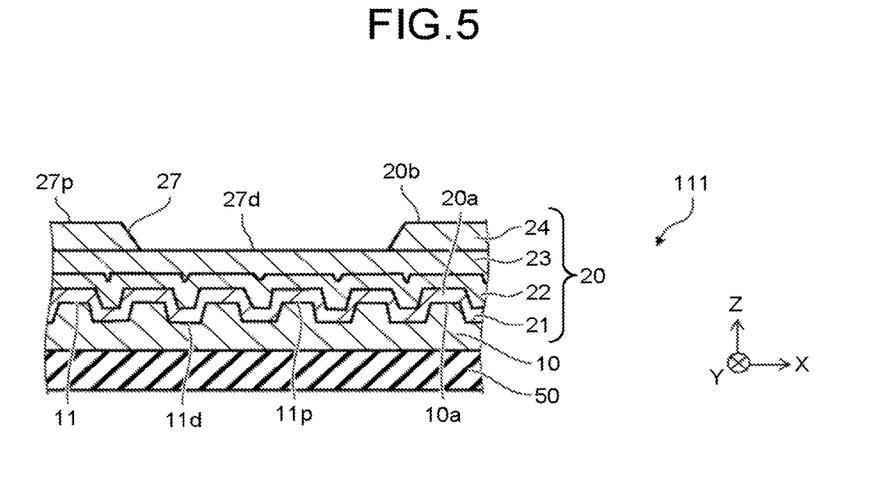
FIG. 5 is a schematic cross-sectional view illustrating another example of the layered object according to the first embodiment.

FIG. 5 is a schematic cross-sectional view illustrating another example of the layered object according to the first embodiment.

As illustrated in FIG. 5, a layered object 111 according to the first embodiment is provided with a large protrusion and depression 27 on the face (third face 20b) of the second part 20. The other configurations of the layered object 111 are the same as those of the layered object 110.

The layered object 111 can be formed, for example, by changing the shape of a part of a layer included in the second part 20. In this example, the layer 24 is formed on a part of the layer 23. For example, the head 60 emits the energy ray 61 to a certain location while feeding the material 20m. In this process, the layer 24 is formed on the certain location, but the layer 24 is not formed on other locations. The protrusion and depression 27 is thus formed on the third face 20b.

The shape of the protrusion and depression 27 on the third face 20b corresponds to the external shape of the layered object 111. The dimensions of the protrusion and depression 27 are larger than those of the protrusions and depressions 11. For example, the width (a length in the X-Y plane) of a protruding portion 27p of the protrusion and depression 27 is larger than that of a protruding portion 11p of the protrusions and depressions 11. For example, the width (a length in the X-Y plane) of a depressed portion 27d of the protrusion and depression 27 is larger than that of a depressed portion 11d of the protrusions and depressions 11.

For example, the face (top face) of the protruding portion 27p of the protrusion and depression 27 is flatter than the face of the protrusions and depressions 11. The face (bottom face) of the depressed portion 27d of the protrusion and depression 27 is flatter than the face of the protrusions and depressions 11.

In the first embodiment, the third face 20b includes a portion (either the protruding portion 27p or the depressed portion 27d, or both) that is flatter than the protrusions and depressions 11. The third face 20b includes a portion that has a higher degree of flatness than the degree of the flatness of the protrusions and depressions 11. In terms of the layered object 111, the third face 20b includes the large protrusion and depression 27 that corresponds to the external shape of the layered object 111. On the first face 10a, the protrusions and depressions 11 are provided that have a shape different from the external shape. Providing the protrusions and depressions 11 increases the contact area between the first part 10 and the second part 20. Thus, a layered object having high rigidity can be obtained.

In the example of FIG. 1, the third face 20b includes a portion flatter than the protrusions and depressions 11 on the first face 10a. In other words, the third face 20b includes a portion that has a higher degree of flatness than the degree of the flatness of the protrusions and depressions 11 on the first face 10a. In the example of FIG. 1, the third face 20b (top face) is flat.

Figure 6:
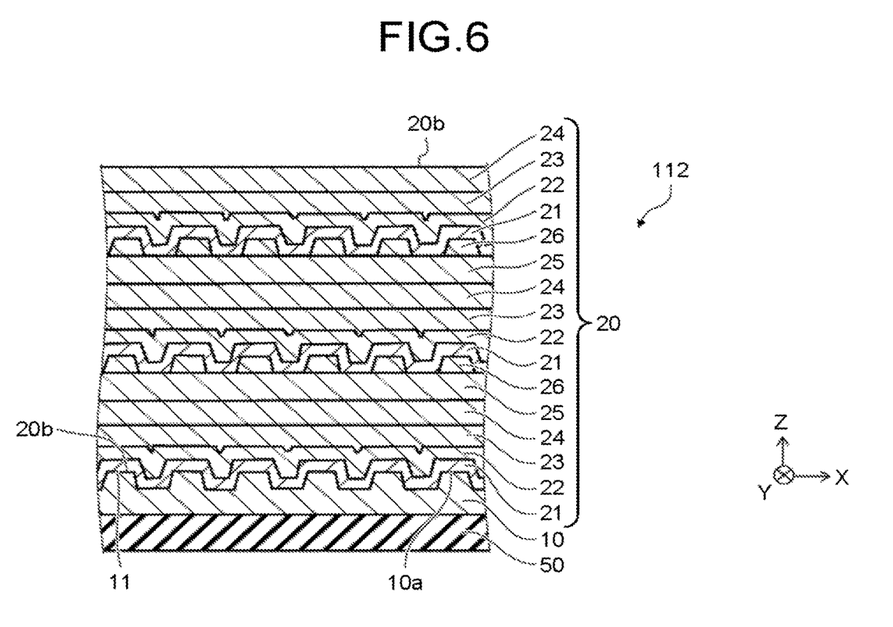
FIG. 6 is a schematic cross-sectional view illustrating still another example of the layered object according to the first embodiment.

FIG. 6 is a schematic cross-sectional view illustrating still another example of the layered object according to the first embodiment.

As illustrated in FIG. 6, layers 21 to 24 as a first group are provided, and layers 25 and 26 are provided thereon. The layer 26 has, for example, a shape of islands or belts. The layers 25 and 26 form protrusions and depressions.

Layers 21 to 24 as a second group are provided on the layers 25 and 26. On the layers 21 to 24 as the second group, layers 25 and 26 as the second group are provided. On the layers 25 and 26 as the second group, layers 21 to 24 as a third group are provided.

In this example, the layers 21 to 24 and the layers 25 and 26 may be regarded as the second part 20. Alternately, the layers 25 and 26 may be regarded as the first part 10. In this case, the first part 10 (layers 25 and 26) and the second part 20 (layers 21 to 24) are stacked alternately.

In this case, the large protrusion and depression 27 may also be provided on the face (third face 20b) of the second part 20. Such a layered object 112 thus obtained can have high rigidity.

Figure 7:
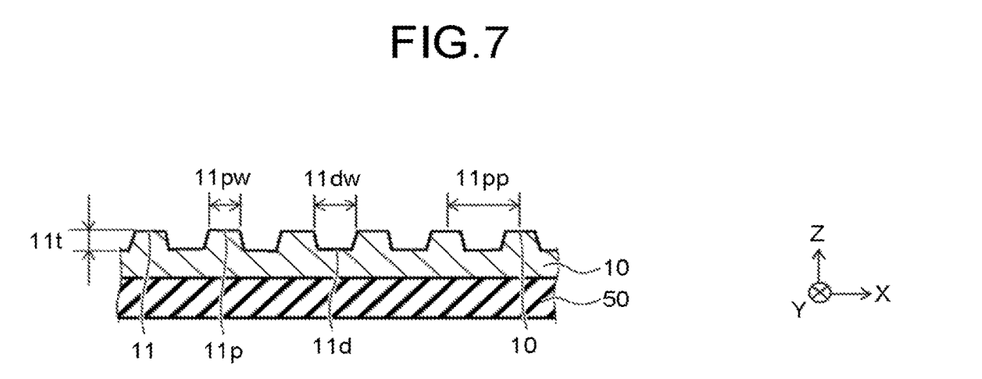
FIG. 7 is a schematic cross-sectional view illustrating an example of a part of the layered object according to the first embodiment.

FIG. 7 is a schematic cross-sectional view illustrating an example of a part of the layered object according to the first embodiment.

FIG. 7 illustrates an example of the shape of the first part 10. As illustrated in FIG. 7, the protrusions and depressions 11 on the first face 10a of the first part 10 include a plurality of protruding portions 11p and a plurality of depressed portions 11d in, for example, an X-Z plane. The X-Z plane is a first cross section including a first direction (for example, the Z-axis direction) extending from the first part 10 to the second part 20. The protruding portions 11p are arranged in a second direction (for example, the X-axis direction). The second direction is a direction that intersects the first direction.

For example, each protruding portion 11p has a certain constant width. The protruding portion 11p has a width 11dw. The width 11dw corresponds to, for example, a length along the second direction (X-axis direction). The protruding portions 11p each have the constant width 11pw. For example, the protruding portions 11p each have the constant width 11pw at at least a part of the protruding portions 11p.

For example, each depressed portion 11d has a certain constant width. The depressed portion 11d has a width 11dw. The width 11dw corresponds to, for example, a length along the second direction (X-axis direction). The depressed portions 11d each have the constant width 11dw. For example, the depressed portions 11d each have the constant width 11dw at at least a part of the depressed portions 11d. In other words, in the first cross section including the first direction extending from the first part 10 to the second part 20, the protrusions and depressions 11 include a plurality of depressed portions 11d arranged in the second direction that intersects the first direction. The depressed portions 11d are spaced apart at regular intervals in the width direction at at least a part of the depressed portions 11d.

The depressed portions 11d of the protrusions and depressions 11 are each interposed between the protruding portions 11p. Thus, the protruding portions 11p may be spaced apart at regular intervals (width 11dw) in the second direction at at least a part of the protruding portions 11p.

When the protrusions and depressions have a constant width and are spaced apart at regular intervals, for example, distribution of stress is uniform across the protrusions and depressions. Thus, rigidity is further increased.

The protrusions and depressions 11 may be arranged at a regular pitch (for example, a pitch 11pp between the protruding portions 11p).

The width 11pw of each protruding portion 11p is, for example, 0.4 mm or more and 5 mm or less. The width 11dw of each depressed portion 11d is, for example, 0.4 mm or more and 30 mm or less. The pitch (for example, the pitch 11pp between the protruding portions 11p) of the protrusions and depressions 11 is, for example, 0.8 mm or more and 35 mm or less. A height 11t (the distance between a protruding portion 11p and a depressed portion 11d in the Z-axis direction) of the protrusions and depressions 11 is, for example, 0.5 mm or more and 10 mm or less.

In the first embodiment, the layers (layers 21 to 24) each have a thickness of, for example, 30 μm or more and 200 μm or less.

FIGS. 8A to 8H are schematic plan views each illustrating an example of a part of the layered object according to the first embodiment.

FIGS. 8A to 8H each illustrate an example of a pattern of the protrusions and depressions 11 of the first part 10.

Figure 8A:
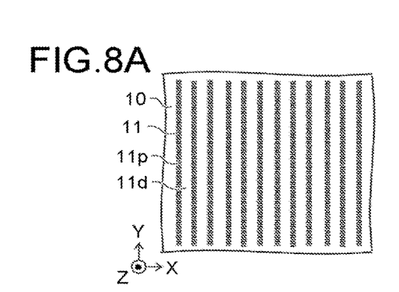
FIGS. 8A to 8H are schematic plan views each illustrating an example of a part of the layered object according to the first embodiment.

In the example of FIG. 8A, a plurality of protruding portions 11p are provided. Each protruding portion 11p extends in the Y-axis direction. The protruding portions 11p are arranged in the X-axis direction. In this example, the depressed portions 11d are contiguous.

Figure 8B:
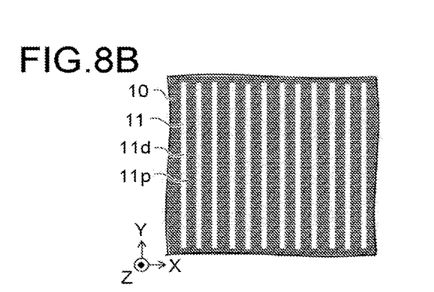

In the example of FIG. 8B, a plurality of depressed portions 11d are provided. Each depressed portion 11d extends in the Y-axis direction. The depressed portions 11d are arranged in the X-axis direction. In this example, the protruding portions 11p are contiguous.

Figure 8C:
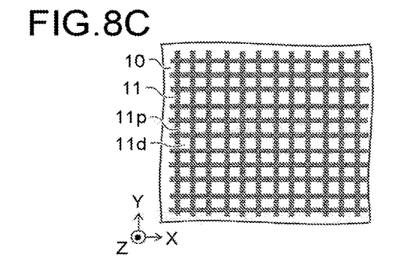

In the example of FIG. 8C, the protruding portions 11p include a portion extending in the Y-axis direction and a portion extending in the X-axis direction. The protruding portions 11p form a grid-like shape. In this example, a plurality of depressed portions 11d are provided.

Figure 8D:
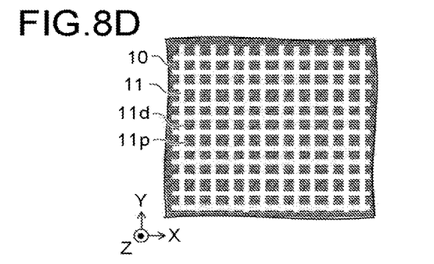

In the example of FIG. 8D, the depressed portions 11d include a portion extending in the Y-axis direction and a portion extending in the X-axis direction. The depressed portions 11d form a grid-like shape. In this example, a plurality of protruding portions 11p are provided.

Figure 8E:
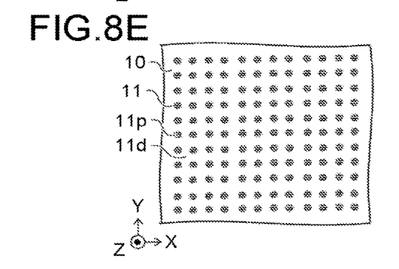

In the example of FIG. 8E, a plurality of protruding portions 11p are arranged in the Y-axis direction and the X-axis direction. In this example, the depressed portions 11d are contiguous.

Figure 8F:
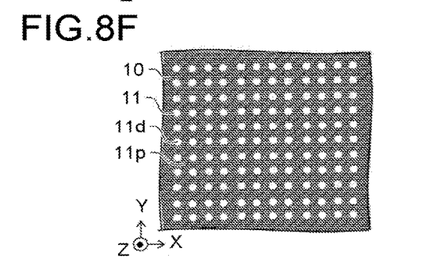

In the example of FIG. 8F, a plurality of depressed portions 11d are arranged along the Y-axis direction and the X-axis direction. In this example, the protruding portions 11p are contiguous.

Figure 8G:
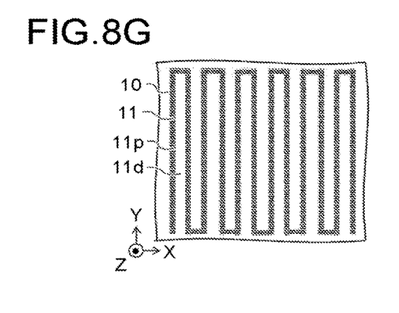

In the example of FIG. 8G, one contiguous protruding portion 11p extends in a zigzag shape along the Y-axis direction and in the X-axis direction. In this example, the depressed portions 11d are contiguous.

Figure 8H:
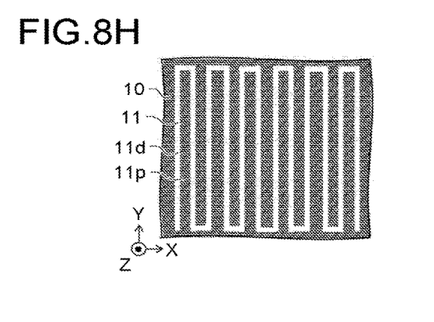

In the example of FIG. 8H, one contiguous depressed portion 11d extends in a zigzag shape along the Y-axis direction and in the X-axis direction. In this example, the protruding portions 11p are contiguous.

Figure 9A:
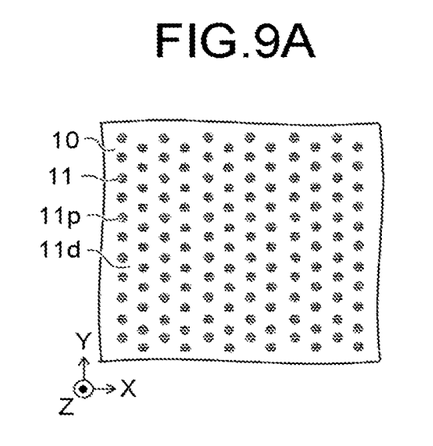
FIGS. 9A and 9B are schematic plan views illustrating an example of a part of the layered object according to the first embodiment.
Figure 9B:
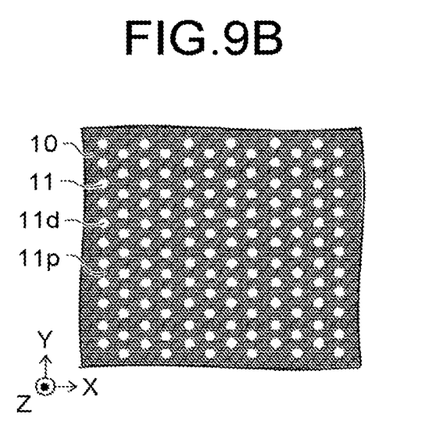

FIGS. 9A and 9B are schematic plan view illustrating an example of a part of the layered object according to the first embodiment.

FIGS. 9A and 9B illustrate examples of a pattern of the protrusions and depressions 11 of the first part 10.

In the example of FIG. 9A, a plurality of protruding portions 11p are provided. The protruding portions 11p are arranged in positions alternately shifted by a half-pitch distance. In this example, the depressed portions 11d are contiguous.

In the example of FIG. 9B, a plurality of depressed portions 11d are provided. The depressed portions 11d are arranged in positions alternately shifted by a half-pitch distance. In this example, the protruding portions 11p are contiguous.

The protrusions and depressions 11 include either a protruding portion 11p extending in the second direction that intersects the first direction (Z-axis direction) or a depressed portion 11d extending in the second direction, or both. The protrusions and depressions 11 may include either a plurality of protruding portions 11p or a plurality of depressed portions 11d, or both.

In the first embodiment, various modifications can be made to the pattern of the protrusions and depressions 11.

Second Embodiment

A second embodiment relates to an apparatus for manufacturing a layered object.

Figure 10:
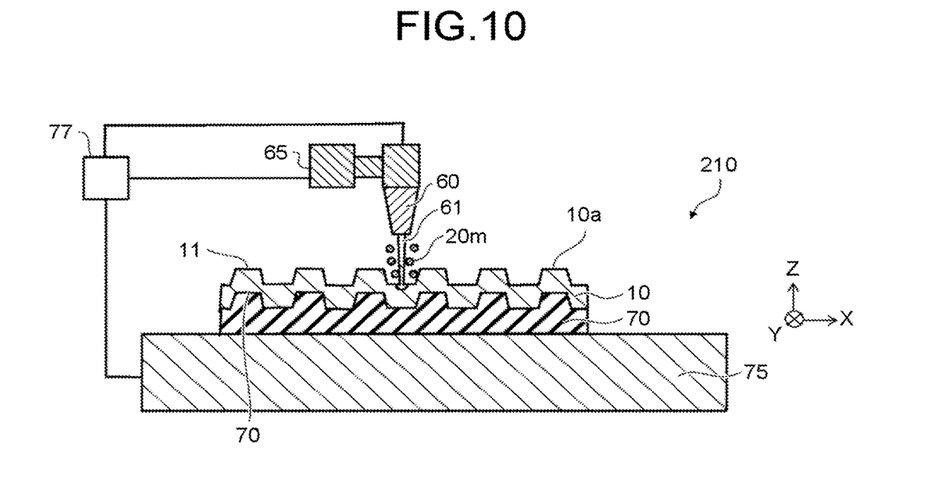
FIG. 10 is a schematic cross-sectional view illustrating an apparatus for manufacturing a layered object according to a second embodiment.

FIG. 10 is a schematic cross-sectional view illustrating an example of an apparatus for manufacturing a layered object according to the second embodiment.

As illustrated in FIG. 10, an apparatus 210 for manufacturing a layered object according to the second embodiment includes a stage 75, the head 60, and a protruding and depressed member 70.

The protruding and depressed member 70 is provided on the stage 75. On the top face of the protruding and depressed member 70, protrusions and depressions 71 are provided.

The head 60 heats and fuses the material 20m while feeding the material 20m to the protruding and depressed member 70. The positional relation between the head 60 and the stage 75 can be changed. For example, the positional relation between the head 60 and the stage 75 may be changed in the Z-axis direction, the X-axis direction, and the Y-axis direction. For example, a controller 77 that is connected with the head 60 and the stage 75 is provided. The controller 77 controls such operations described above.

For example, the first part 10 can be formed on the protruding and depressed member 70 having the protrusions and depressions 71 by using the material 20m. The protrusions and depressions 11 of the first part 10 reflect the protrusions and depressions 71 of the protruding and depressed member 70.

The apparatus 210 can efficiently form the first part 10 having the protrusions and depressions 11 by using the protruding and depressed member 70. The second part 20 is then formed on the first part 10, whereby a layered object having high rigidity can be efficiently obtained.

In the second embodiment, a distance detector 65 may also be provided. The distance detector 65 detects, for example, the distance between the head 60 and the protruding and depressed member 70. The distance detector 65 detects, for example, the distance between the head 60 and the first part 10. On the basis of the detected distance, for example, the distance between the head 60 and the protruding and depressed member 70 and the distance between the head 60 and the first part 10 are controlled.

Third Embodiment

A third embodiment relates to a method for manufacturing a layered object.

In this method, a plurality of layers (the layers 21 to 24, for example) are deposited on the first part 10 including the first face 10a having the protrusions and depressions 11 to form the second part 20 that is in contact with the first face 10a. The layers are each formed such that the material 20m of the second part 20 is heated and fused while the material 20m is being fed. For example, the second part 20 includes the second face 20a and the third face 20b. The second face 20a fits with the protrusions and depressions 11. The third face 20b is at the opposite side of the second face 20a. The third face 20b includes a portion flatter than the protrusions and depressions 11. In other words, the third face 20b includes a portion that has a higher degree of flatness than the degree of the flatness of the protrusions and depressions 11. By this method, a layered object having high rigidity can efficiently be obtained.

According to the embodiments, a layered object having high rigidity, a method for manufacturing the layered object, and an apparatus for manufacturing the layered object can be provided.

In the description, the words "perpendicular" and "parallel" do not necessarily refer to the exact perpendicularity or exact parallelism, and may include, for example, deviations in the manufacturing process and may refer to substantial perpendicularity and substantial parallelism.

While the embodiments of the present invention have been described with reference to examples, the present invention is not limited to these examples. For example, various other specific configurations of the elements such as the first and the second parts included in the layered object, and the head, the stage, and the protruding and depressed member included in the apparatus may be encompassed within the scope of the present invention provided that the skilled person can practice the invention by selecting such elements from the known art as appropriate and can obtain the same effects.

Various technically possible combinations of two or more elements of the examples may be encompassed within the scope of the present invention provided that the combinations include the spirit of the present invention.

All other layered objects and methods and apparatuses for manufacturing the layered objects practicable by the skilled person by making appropriate design changes based on the layered object and the method and the apparatus for manufacturing the layered object according to the embodiments of the present invention are encompassed within the scope of the present invention provided that the layered objects, methods, and apparatuses include the spirit of the present invention.

Within the concept of the present invention, the skilled person may think of various alterations and modifications of the present invention, and it is understood that such alterations and modifications may be encompassed within the scope of the present invention.

While certain embodiments of the present invention have been described, these embodiments have been presented by way of example only, and are not intended to limit the scope of the invention. Indeed, the novel embodiments described herein may be embodied in a variety of other forms; furthermore, various omissions, substitutions, and changes may be made without departing from the spirit of the invention. The accompanying claims and their equivalents are intended to cover such forms or modifications as would fall within the scope and spirit of the invention.

The invention claimed is:

1. A method for manufacturing a layered object including a plurality of layers, the layered object comprising a first part including a first face having protrusions and depressions, the first part constituting a part of the layers, and comprising a second part that is in contact with the first face, the second part including a second face that conforms to a shape of the protrusions and depressions and including a third face opposite the second face, the second part including another part of the layers, the third face having a higher degree of flatness than a degree of flatness of the protrusions and depressions, the method comprising:
    depositing the second part that is in contact with the first face on the first part including the first face having the protrusions and depressions,
    forming the second part by heating and fusing material of the second part using a head while the material is being fed from the head,
    detecting a distance between the head and the first face, and controlling the distance based on the detected distance.

2. The method according to claim 1, wherein the depositing includes depositing the second part such that at least a part of the second part contains a material identical to a material of the first part.

3. The method according to claim 1, wherein
    the protrusions and depressions of the first face include, in a first cross section including a first direction extending from the first part to the second part, a plurality of protruding portions arranged in a second direction that intersects the first direction, and
    the protruding portions each have a constant width in at least a part of the protruding portions.

4. The method according to claim 1, wherein
    the protrusions and depressions of the first face include, in a first cross section including a first direction extending from the first part to the second part, a plurality of depressed portions arranged in a second direction that intersects the first direction, and
    the depressed portions each have a constant width in at least a part of the depressed portions.

5. The method according to claim 1, wherein the protrusions and depressions of the first face include either a protruding portion extending in a second direction that intersects a first direction extending from the first part to the second part or a depressed portion extending in the second direction, or both.

6. The method according to claim 1, wherein the depositing includes depositing the second part such that a part including the second face contains a material identical to a material of a part including the first face.

* * * * *